United States Patent [19]

Meredith et al.

[11] E Re. 30,567

[45] Reissued Apr. 7, 1981

[54] TROLLING MOTOR SAFETY MOUNT

[76] Inventors: Robert W. Meredith, 8910 Dailey Dr., Little Rock, Ark. 72209; Norman B. McCreary, 45 Lakeshore Dr., Little Rock, Ark. 72204

[21] Appl. No.: 27,283

[22] Filed: Apr. 4, 1979

Related U.S. Patent Documents

Reissue of:

[64] Patent No.: 4,019,703
Issued: Apr. 26, 1977
Appl. No.: 667,827
Filed: Mar. 17, 1976

[51] Int. Cl.[2] ..... B63H 21/26; B63H 21/30

[52] U.S. Cl. ..... 248/642; 440/113

[58] Field of Search ..... 248/642, 640, 641; 115/17, 18 R

[56] References Cited

U.S. PATENT DOCUMENTS

| | | | |
|---|---|---|---|
| 774,229 | 11/1904 | Borein | 292/101 |
| 2,782,744 | 2/1957 | Staley | 115/17 X |
| 2,928,631 | 3/1960 | Hartman | 248/641 |
| 3,119,365 | 1/1964 | Evans | 115/17 |
| 3,750,988 | 8/1973 | Lyon | 115/17 X |

*Primary Examiner*—J. Franklin Foss
*Attorney, Agent, or Firm*—Cushman, Darby & Cushman

[57] ABSTRACT

A safety mount for a trolling motor including a clamp for attachment to the stern of a boat, a hollow mounting block pivotally mounted to the clamp, a detent arrangement disposed within the interior area defined by the block and for normally maintaining the block in abutting relationship with the clamp (the trolling motor being in operative position in the water), and a latch for latching the motor out of the water. The detent arrangement is so constructed that if the motor strikes an underwater object, the block will be pivoted with respect to the clamp and move the motor out of engagement with the object. Once the object is passed, the weight of the motor will move the block back to its normal operating position. The motor may be manually pivoted out of the water, and the block latched so that the motor remains in its inoperative position.

16 Claims, 7 Drawing Figures

TROLLING MOTOR SAFETY MOUNT

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to apparatus for mounting a conventional electric trolling motor or the like to the stern section of a boat so that the motor will not be damaged when it comes in contact with underwater objects, but rather will be allowed to move out of engagement with the objects. When motors are mounted without this capability, there is a large potential for serious damage thereto if they should strike an underwater object. While there are a number of prior art suggestions for pivotally mounting motors to avoid this problem—such as shown in U.S. Pat. Nos. 2,972,977 and 3,698,672—the prior art devices may have problems of corrosion or breakage of the detent members associated therewith because of the harsh environment in which they are disposed, and such prior art devices normally utilize rather complicated mounting bracket assemblies for mounting conventional trolling motors or the like thereto. According to the apparatus of the present invention, however, the corrosion and breakage potential of the detent means is greatly reduced, simple conventional clamps may be utilized to readily mount the motor to the safety apparatus, and the whole apparatus in general is simpler and easier to construct and use.

According to the present invention, safety mounting apparatus is provided comprising a clamping means for securement to the stern section of a boat, a hollow mounting block pivotally mounted to the clamping means, detent means disposed within the interior area defined by the hollow mounting block, and means for latching the mounting block in a position wherein the motor will be disposed generally out of operative position. The clamping means comprises any suitable means such as an aluminum U-shaped member and a screw-threaded clamping rod associated therewith. The mounting block has closed sides, a closed top, and an open bottom, the bottom engaging a portion of the clamping means when the block is in a first position for normal operation of the motor. The detent means disposed within the interior area defined by the hollow block when it is in its first position is protected from the elements, and from breakage due to it being inadvertently struck by a person or object within the boat or on a pier. The detent means is constructed so that the block will be retained in its first position against the normal thrust provided by the motor, but yet will allow the block to be pivoted to a second position so that a motor mounted thereon will pivot out of interfering engagement with an underwater object that is struck by the motor. Once the object is passed, the weight of the motor is sufficient to move the block back to the first position thereof wherein its open end abuts the clamping means, and the detent latches it in its place. The detent means may include a nylon flexible member having a ball on the free end of an arm thereof cooperating with a depression formed in an interior wall of the block.

The mounting block is specially adapted to readily receive a conventional clamp for a trolling motor, and thereby mount the motor to the boat. When it is desired to move the motor out of operative position, it is manually pivoted backwardly about the pivotal connection of the mounting block to the clamping means, and it is latched in its inoperative position. Suitable latching means includes a hook and eyelet arrangement, the elements respectively attached to the block and the clamping means. A cushion may be provided on the clamping means to serve as an abutment or stop against movement of the motor out of the water past its latching position.

It is the primary object of the present invention to provide a simple, improved mounting apparatus for mounting a trolling motor to the stern section of a boat. This and other objects of the invention will become clear from an inspection of the detailed description of the invention, and from the appended claims.

DETAILED DESCRIPTION OF THE INVENTION

Figure 1A:
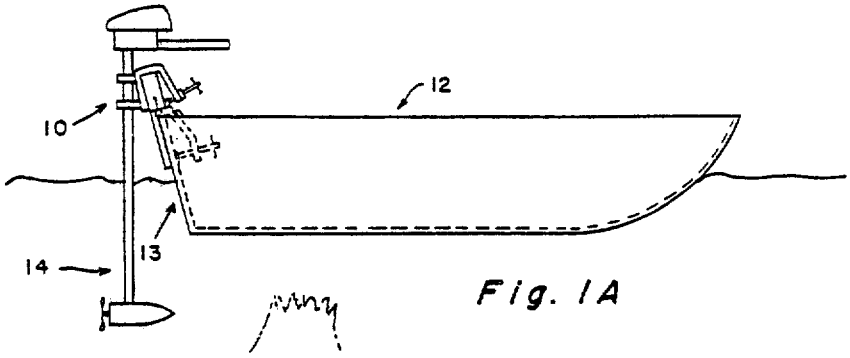
FIG. 1a is a schematic view of exemplary apparatus according to the present invention in use in normal operating relationship with a boat.

Apparatus for mounting a trolling motor 14 or the like to the stern section 13 of a boat 12 or the like is shown generally at 10 in the drawings. The major components of the apparatus include a clamping means 16 for releasable clamping engagement with section 13 of boat 12, a hollow mounting block 18 adapted to receive a conventional mounting clamp for a trolling motor 14 or the like, means 22 for pivotaly mounting the mounting block 18 to the clamping means 16 so that a motor clamped to the mounting block 18 may be pivoted from a first position (FIG. 1a) to a second position (FIG. 1b), or to a third position (FIG. 1c), detent means 24 located within the area A defined by the hollow mounting block 18, and means 26 for locking the mounting block 18 in its third position (FIG. 1c) with respect to the clamping means 16.

Figure 1B:
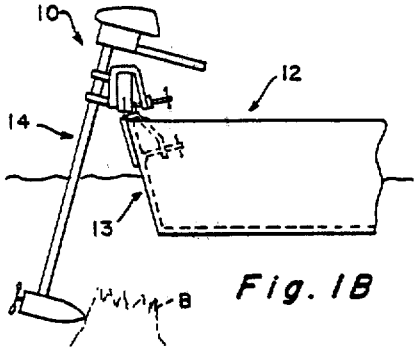
FIG. 1b is a schematic showing of the apparatus of FIG. 1a showing the motor being pivoted out of interfering engagement with an underwater object.
Figure 1C:
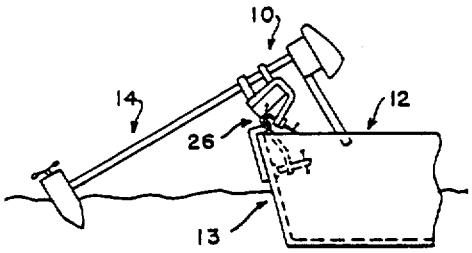
FIG. 1c is a schematic view of the apparatus of FIG. 1a showing the motor latched in an inoperative position thereof.

The clamping means 16 may comprise any suitable means for securely clamping the apparatus 10 to a boat stern section, such as the readily removable U-shaped member 30 shown in the drawings. The U-shaped member 30 has a screw-threaded rod 32 associated therewith and a clamping abutment 34 formed on the end of the rod 32. The member 30 is brought into engagement with the stern section 13 of the boat 12, and the rod 32 is threaded in until member 34 makes tight engagement with the stern section 13. A cushion 36 of plastic or the like preferably is disposed on the member 30 to provide a stop for a motor clamp that is disposed in mounting relationship with the mounting block 18. An upper surface 38 of the member 30 supports the detent means 24 and is abutted by the open end 20 of the mounting block when the block 18 is in its first position (FIG. 1a). The member 30 may be made of aluminum or the like, and the threaded rod 32 of steel or the like.

The mounting block 18 is a hollow member which may be constructed of aluminum or the like, and has closed sides 40 and a closed top 41, and an open bottom portion 20. The interior of the mounting block 18 defines a volume A which receives the detent means therein when the block 18 is in a first position (FIG. 1a) with the open end 20 thereof abutting the top 38 of the clamping means 16. The block 18 normally protects the detent means 24 from the corrosive action of the elements, as well as protecting it from breakage due to extraneous mechanical forces that might be inadvertently applied thereto. The block form of the member 18 also facilitates the clamping thereto of a wide variety of conventional clamps of trolling motors on the market.

The detent means 24 located within the area A defined by the interior of the hollow block 18 may include a depression 43 formed in an interior wall 42 of the block 18, cooperating with a flexible member 44. The flexible member 44 may comprise a flexible arm 45 attached to the upper surface 38 of the clamping means 16, and a ball 46 formed on the free end of the arm 45, the ball 46 being a shape for ready cooperation and latching engagement with the depression 43 formed in the wall 42. To insure a long life for the detent means despite the environment in which it is to be used, the member 44 may be constructed of nylon. A slanted portion 47 is formed on the bottom of the interior wall 42 of block 18 to cam the member 44 out of the way (see FIG. 2b) when the block is being pivoted from its first position (FIG. 1a) to its second position (FIG. 1b), and vice-versa.

The latching means 26 for latching the block 18 in a position (FIG. 1c) wherein the motor 14 is generally out of the water (or certainly above the bottom of the boat 12) may comprise a hook member 50 and an eyelet 56. The hook member 50 has a hook portion 52 thereof, and is pivotally mounted—as by ring 54—to the mounting block 18. The eyelet 56 has an opening 58 in the middle thereof for receiving the hook portion 52, and has a bottom portion 59 thereof which may be abutted by the hook portion 52. When the block 18 is latched in its third position (FIG. 1c) the hook portion 52 may extend either through the opening 58, or past the eyelet 56 to abut the undersurface 59 of the eyelet 56, thus assuming one of two subpositions elevating the motor 14 different degrees out of the water.

Any type of conventional motor may be clamped to the mounting block 18, and the apparatus is specifically constructed to allow conventional clamps 60 associated with conventional motors 14 to be attached thereto without the need for accessory adaptor clamping means. A conventional clamp 60 is shown in detail in FIGS. 2a–2c, and includes a U-shaped member 61 and a screw-threaded rod 62 cooperating therewith for engaging opposite closed sides 40 of the mounting block 18.

Figure 2A:
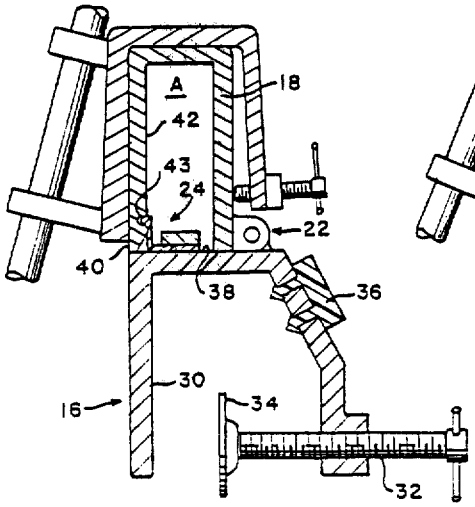
FIGS. 2a–2c are detailed cross-section or elevational views of the apparatus of FIGS. 1a–1c corresponding respectively to the positions in FIGS. 1a–1c.
Figure 2B:
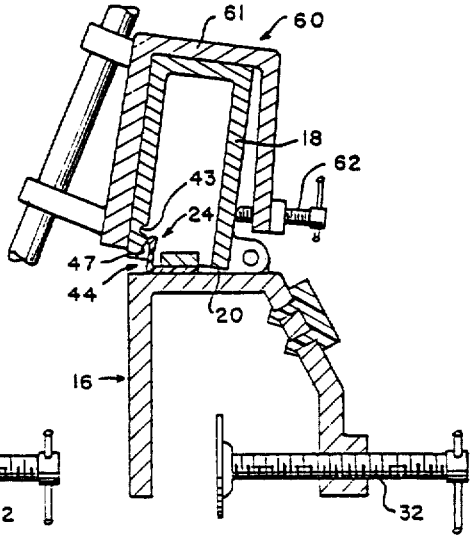
Figure 2C:
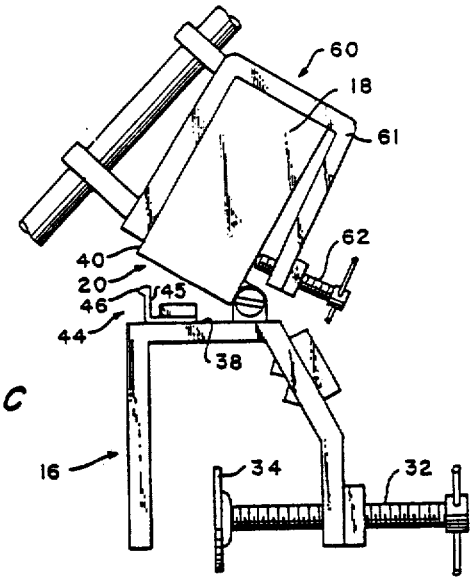
Figure 3:
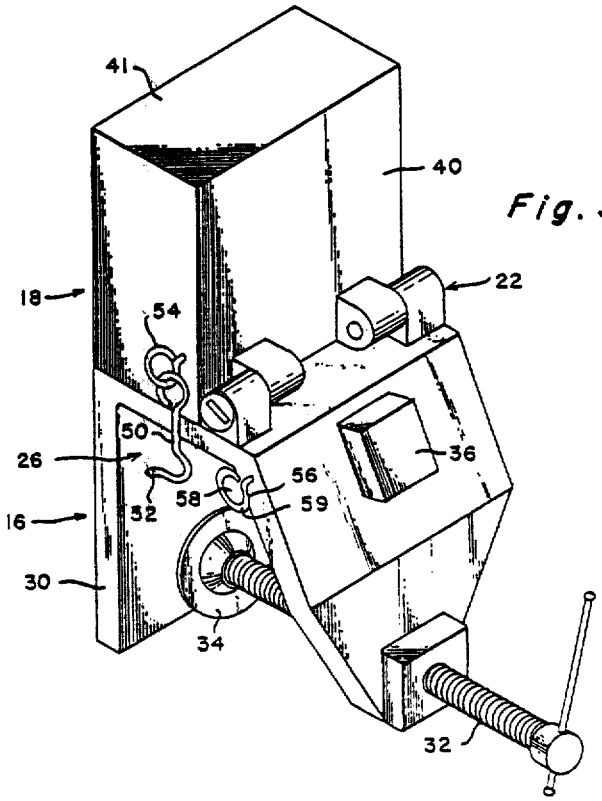
FIG. 3 is a perspective view of the apparatus shown in FIG. 1a by itself, detached from a boat or motor.

Exemplary apparatus according to the invention having been described, a typical operation thereof will now be set forth. The threaded rod 32 is rotated outwardly with respect to the U-shaped member 30 until the stern section 13 of a boat 12 may be abutted by the member 34 and a wall of member 30, the clamping means 16 is slipped over the stern section of the boat, and the rod 32 is rotated so that the member 34 is brought into tight clamping engagement with the stern section 13 of the boat 12. A motor 14 or the like is then mounted to the mounting block 18, a conventional clamp 60 being all that is necessary to affix the motor 14 to the block 18. In normal motor operating (first) position, the block 18 has the open end 20 thereof abutting a surface 38 of the clamping means 16, and the detent means 24 holds the block in that position. The detent means 24 is so constructed that it will maintain the block 18 in its first position (as shown in FIGS. 1a and 2a) despite the thrust that is provided by the normal operation of the motor 14.

While the boat 12 is moving in the water with the block 18 in its first position, should the motor 14 strike an underwater object B or the like that has the potential of doing damage thereto, the block will pivot from its first position (FIGS. 1a and 2a) to a second position wherein the motor 14 is closer to the surface of the water and is moved out of the way of the object B. The block 18 is shown during its pivoting movement to allow the motor to move out of engagement with the object B in FIGS. 1b and 2b. The detent means 24 does not provide a large enough latching force to retain the block 18 open end 20 in engagement with the surface 38 of clamping means 16 when an object B or the like is struck, and the end 20 moves out of engagement with the clamping means 16. When the object B is passed, the weight of the motor 14 acting through the pivot 22 is normally sufficient to automatically move the block 18 back to its first position, the surface 47 camming the flexible member 44 out of the way during movement back to the first position.

When it is desired to elevate the motor 14 so that it is not in operative position in the water, the latching means 26 are utilized. The block 18 is manually pivoted with respect to the means 16 to a third position (FIGS. 1c and 2c) wherein the motor 14 is elevated the desired degree, and the hook portion 52 of member 50 is then brought into operative engagement with the eyelet 56 (see FIG. 1c). The motor will then remain in this position until it is manually released. The cushion 36 is provided on the means 16 to prevent damage to the means 16 and the clamp 60 rod 62 should the motor 14 inadvertently be pivoted back too far during the latching thereof, the cushion 36 providing a stop against further movement of the motor 14 out of the water.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Apparatus for mounting a trolling motor or the like to the stern section of a boat, said apparatus comprising clamping means for releasable clamping engagement with the stern section of a boat, a hollow mounting block having closed top and side walls thereof, and an open bottom end thereof, said mounting block having the proper dimensions to receive a mounting clamp for a trolling motor or the like thereon, means for pivotally mounting said mounting block to said clamping means so that a motor clamped to said mounting block can be pivoted from a first position wherein it is in stable operating position in water in which the boat is disposed with the mounting block open end abutting a portion of said clamping means, to a second position wherein the motor is closer to the water's surface then in said first position and said open end of said mounting block does not abut a portion of said clamping means, to a third position wherein the motor is generally pivoted out of the water, detent means located within the area defined by said hollow mounting block when said block is in said first position for releasably latching said mounting block in said first position so that the normal thrust of a motor mounted on said mounting block will not cause said mounting block to be pivoted to said second position, but so that should the motor on said mounting block strike an object that is underwater said mounting block will be moved to said second position, and so that after the underwater object is passed by the motor, the normal weight of the motor and the mounting block will move said mounting block back to said first position and cause said detent means to latch said mounting block in said first position, and means separate from said detent means for locking said mounting block in said third position when manually moved to said third position.

2. Apparatus as recited in claim 1 wherein said detent means comprises a flexible detent member attached to said clamping means within the area thereof defined by said hollow mounting block when said mounting block is in said first position, and a depression formed on an interior surface of a side of said hollow mounting block for cooperating with said flexible detent member.

3. Apparatus as recited in claim 2 wherein said flexible detent member is made of nylon.

4. Apparatus as recited in claim 2 wherein said flexible detent member comprises a spring arm member extending upwardly from said clamping means and having a free end thereof remote from said clamping means, and a detent ball formed on said free end of said spring arm member.

5. Apparatus as recited in claim 2 further comprising a camming portion formed on a side of said mounting block adjacent the open end thereof for camming said flexible member out of the way of said mounting block during pivoting thereof and so that it will be received by said depression.

6. Apparatus as recited in claim 1 wherein said means for locking said mounting block in said third position comprises a hook member pivotally attached to said mounting block, and an eyelet affixed to said clamping means.

7. Apparatus as recited in claim 6 further comprising means for affixing said eyelet with respect to said clamping means so that a hook portion of said hook member may either be disposed through said eyelet, or may abut a bottom portion of said eyelet while not being disposed therethrough, so that said mounting block may be latched in either of two adjacent subpositions in said third position thereof.

8. Apparatus as recited in claim 1 wherein said clamping means comprises a generally U-shaped member having a screw-threaded rod with clamping abutment movable with respect thereto.

9. Apparatus as recited in claim 1 further comprising a motor attached to said mounting block, said motor having a standard U-shaped clamp with threaded rod for attaching it to said mounting block whereby said mounting block may mount a conventional motor without the need for special adaptor mounting means therefor.

10. Apparatus as recited in claim 1 further comprising cushion means formed on said clamping means for providing a cushioned abutment for abutting a clamp for clamping a motor to said mounting block when said mounting block is in said third position.

*11. Apparatus for mounting a trolling motor or the like to the stern section of a boat, said apparatus comprising*

*clamping means for releasable clamping engagement with the stern section of a boat,*

*a mounting block for mounting a trolling motor or the like therewith,*

*means for pivotally mounting said mounting block to said clamping means so that a motor mounted to said mounting block can be pivoted from a first position wherein it is in stable operating position in water in which the boat is disposed with a portion of the mounting block abutting a portion of said clamping means, to a second position wherein the motor is closer to the water's surface then in said first position and said portion of said mounting block does not abut said portion of said clamping means, to a third position wherein the motor is generally pivoted out of the water, and*

*detent means including a depression formed in said mounting block and said clamping means, and a projection operatively biased toward engagement with said depression and formed on the other of said mounting block and said clamping means; said detent means for releasably latching said mounting block in said first position so that the normal thrust of a motor mounted on said mounting block will not cause said mounting block to be pivoted to said second position, but so that should the motor on said mounting block strike an object that is underwater said mounting block will be moved to said second position, and so that after the underwater object is passed by the motor, the normal weight of the motor and the mounting block will move said mounting block back to said first position and cause said detent means to latch said mounting block in said first position.*

*12. Apparatus as recited in claim 11 wherein said mounting block is hollow, and wherein said detent means is located within the area defined by said hollow mounting block when said mounting block is in said first position.*

*13. Apparatus as recited in claim 11 further comprising means for positively maintaining said mounting block in said third position when manually moved to said third position.*

*14. Apparatus as recited in claim 11 wherein said mounting block has a closed top and side walls thereof and has the proper dimensions to receive a mounting clamp for a trolling motor or the like thereon.*

*15. Apparatus as recited in claim 14 wherein said mounting block has an open bottom end, said open bottom end of said mounting block comprising the portion thereof which abuts said clamping means in said first position.*

*16. Apparatus for mounting a trolling motor or the like to the stern section of a boat, said apparatus comprising*

*clamping means for releasable clamping engagement with the stern section of a boat,*

*a mounting block for mounting a trolling motor or the like therewith,*

*means for pivotally mounting said mounting block to said clamping means so that a motor mounted to said*

*mounting block can be pivoted from a first position wherein it is in stable operating position in water in which the boat is disposed with a portion of the mounting block abutting a portion of said clamping means, to a second position wherein the motor is closer to the water's surface than in said first position and said portion of said mounting block does not abut said portion of said clamping means, to a third position wherein the motor is generally pivoted out of the water,*

*detent means located within the area defined by said hollow mounting block when said block is in said first position for releasably latching said mounting block in said first position so that the normal thrust of a motor*

*mounted on said mounting block will not cause said mounting block to be pivoted to said second position, but so that should the motor on said mounting block strike an object that is underwater said mounting block will be moved to said second position, and so that after the underwater object is passed by the motor, the normal weight of the motor and the mounting block will move said mounting block back to said first position and cause said detent means to latch said mounting block in said first position, and*

*means separate from said detent means for maintaining said mounting block in said third position when manually moved to said third position.*

* * * * *